(12) United States Patent
Han et al.

(10) Patent No.: US 6,743,567 B2
(45) Date of Patent: Jun. 1, 2004

(54) POLYMER FOR DATA STORAGE, DATA STORAGE MEDIA COATED BY THE SAME, DATA STORAGE DEVICE AND METHOD USING DATA STORAGE MEDIA

(75) Inventors: Yang Kyoo Han, Seoul (KR); Bong Cheol Kim, Seoul (KR); Bong Soo Ko, Seoul (KR); Jin Hong Kim, Kyonggi-do (KR); Hai Sub Na, Seoul (KR); Ki Myung Hong, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 09/832,836

(22) Filed: Apr. 12, 2001

(65) Prior Publication Data

US 2003/0017261 A1 Jan. 23, 2003

(51) Int. Cl.$^7$ .............. G11B 7/24; C08F 22/10; C08F 122/10; C08F 222/10
(52) U.S. Cl. ............ 430/270.14; 430/945; 430/19; 526/72; 526/312; 526/321
(58) Field of Search ............ 430/19, 270.14, 430/945; 526/314, 72, 321

(56) References Cited

U.S. PATENT DOCUMENTS

| | | | | |
|---|---|---|---|---|
| 5,173,381 A | * | 12/1992 | Natansohn et al. | 430/19 |
| 5,384,221 A | * | 1/1995 | Savant et al. | 430/19 |
| 5,672,760 A | * | 9/1997 | Burns et al. | 564/440 |

FOREIGN PATENT DOCUMENTS

| JP | 08-012709 | * | 1/1996 |
|---|---|---|---|
| KR | 1019940006131 | * | 7/1994 |
| KR | 1020000252948 | * | 1/2000 |

OTHER PUBLICATIONS

Han et al., Mol. Cryst. Liq. Cryst. vol. 327, pp. 271–274 (1999).*
Han et al., Mol. Cryst. Liq. Cryst. vol. 349, pp. 75–78 (2000).*
Han et al., Polymer Preprints, vol. 40(2) pp. 1234 (1999).*
Han et al., Mol. Cryst. Liq. Cryst. vol. 327, pp. 271–274 (1999) (abstract only).*
Brehmer et al., Macromol. Symp., vol. 102, pp. 391–398 (1996).*
Chollet et al., Thin Solid Films, vol. 242, pp. 132–138 (1994).*
Park et al., Kongop Hwahak, vol. 11(2) pp. 151–156 (04/2000).*
Bauer et al., Appl. Phys. Lett., vol. 63(15) pp. 2018–2020 (1993).*

* cited by examiner

*Primary Examiner*—Martin Angebranndt
(74) *Attorney, Agent, or Firm*—Birch, Stewart, Kolasch & Birch, LLP

(57) ABSTRACT

The present invention relates to a polymer for data storage that is sensitive to a light source, a data storage media coated by the same, and a data storage device and method using the data storage media. In particular, the present invention relates to a polymer for data storage comprising two of the functional group of disperse red 1, which is a photoresponsive organic dye, bonded to a branched chain per every repeat unit, a data storage media coated by the same, a reversible and optical data storage device containing a thin film, and a data storage method using the device.

6 Claims, 6 Drawing Sheets

Recording
laser intensity :   5mW    4mW    3mW    2mW    1mW

Recording
pulse duration time: 10μs

POLYMER FOR DATA STORAGE, DATA STORAGE MEDIA COATED BY THE SAME, DATA STORAGE DEVICE AND METHOD USING DATA STORAGE MEDIA

BACKGROUND OF THE INVENTION

1. Field of the Invention

The present invention relates to a laser-sensitive polymer for data storage, a data storage media coated by the same, and a data storage device and method using the data storage media. In particular, the present invention relates to a polymer for data storage comprising two of the functional group of disperse red 1, which is a photoresponsive organic dye, bonded to a branched chain per every repeat unit, a data storage media coated by the same, a reversible and optical data storage device containing a thin film, and a data storage method using the device.

2. Description of the Related Art

In general, an optical data storage method involves a data storage media consisting of short wave-length laser and organic dyes sensitive to the same, of which method has a benefit of high density data storage. Taking advantage of properties of the organic dyes, e.g. easy structural transformation and an excellent processability for manufacturing thin films, the inventors discovered a reversible and optical data storage method using a data storage media for which the organic dyes or optical polymers containing the dye compounds as a substituent is applied. (Refer to U.S. Pat. Nos. 5,262,081, 5,445,853, 5,296,321, 4,666,819 and 5,384,221, German Patent No. 3623395, British Patent No. GB 2. 146787A, and Japanese Laid-Open Publication 1-294791.)

The basic principle of a reversible data storage method capable of data record-erase-read-rewrite is that when laser is irradiated to a data storage media containing organic dyes, the dyes go through color changes, birefringence changes and phase transition (e.g. crystal form ↔ amorphous form or isotropic form ↔ anisotropic form), depending on molecular structures thereof.

Well-known organic dyes for the technology described above include cyanine, phthalocyanine, squarilium, dithiol metal complex salt, quinone, spiropyran and azobenzene, and so forth.

The similarity in the molecular structure of each compound listed above is that each compound contains a different polar group that causes dipole moment. Thus, when a data storage media coated with one of the compounds above is irradiated by a polarized light with a particular wavelength, the molecules are arranged perpendicular to the plane of polarization of the irradiated light, which is basically due to the attractive force between dipole moments in a polar group. In this way, the newly arranged molecules go through the three optical changes aforementioned, and using this principle, data can be recorded in a data storage media.

The organic dyes applied to a data storage media, depending on a polar group's molecular structure, absorb ultraviolet or infrared having a wavelength 300 nm to 800 nm. Therefore, in order to develop an appropriate data storage element, it is important to choose a light source with particular wavelengths that causes optical changes in the data storage media.

Typically used light source for an optical data storage is a laser like Ga/As, He—Ne, Ar ion, Nd/YAG or He—Cd, having a wave-length of 780 nm, 630 nm, 488 nm, 514 nm, 360 nm or 325 nm.

However as for Compact disc (CD) or Laser disc (LD), for which an optical data storage media is applied, only 780 nm Ga/As and 630 nm He—Ne have been commercially used as a minor light source for a disc drive. Unfortunately, when these lights with longer than 600 nm wavelength are used as a recording light source for an optical data storage device, since the lights oscillate relatively long infrared, data storage density gets decreased thereby.

This problem occurs typically during the process of recording data, if an organic dye compound containing thin film is irradiated by polarized recording light having long wave length, the irradiation area of a data storage media is enlarged as compared with a short wave length light source. Therefore by using Ar ion laser of which wave length is below 520 nm as a recording light source, the area of a data storage media becomes small and data storage density per unit area is increased.

Attempts to increase data storage density as described above have been made by developing a polymer in which a functional group of azobenzene base organic dye compound is bonded to a branched chain, which is sensitive to a short wave length in a range from 300 nm to 400 nm. Thus, the inventors researched on the applications of a reversible and optical data storage media to the above polymer compound and were granted a patent in Korea (Korean Patent No. 77801, Application filing date: Feb. 27, 1991), and in relation to this, another application (Korean Patent Application No. 40216, Filing date: Aug. 22, 1997) was already laid open.

The basic mechanism behind the above technology is that a polymer having azobenzene base compound bonded to a branched chain coated a substrate to manufacture a thin film, and low output polarized ultraviolet was irradiated to the thin film. In result, it was possible to record data in high density with excellent resolution and new data could be rewritten after easing the previous data.

The media described above showed much improved resolution and recording speed by hundreds of nanosecond) as compared to those of prior art (U.S. Pat. No. 5,173,381) and German Patent No. 3,623,395: U.S. Pat. No. 4,837,745 and Japanese Publication No. 63-87626).

The pulse laser was observed as very beneficial not only that it was based on the molecular structure of a polymer compound employed, but also that it made it possible to record high density data at a speed of hundreds of nanosecond faster than others by using Nd/YAG pulse laser as a recording light, which usually oscillate a ultraviolet with 365 nm within 10 nanosecond.

Despite the benefits described above, because the short wave length pulse laser uses inorganic single crystal, thus making it expensive and big, it is considered rather inappropriate oscillation material for a compact sized data storage device.

Therefore, attempts to solve the cost and size problems, by applying Ar ion laser of which wave length can be modulated and is not expensive, have been made active for applying to a compact data storage device.

SUMMARY OF THE INVENTION

It is, therefore, an object of the present invention to provide a polymer compound for data storage.

Another object of the present invention is to provide a data storage media using a substrate coated with such polymer.

Still another object of the present invention is to provide a data storage device for data write/read into such data storage media and a data storage method thereof.

To achieve the above object, there is provided 5 polymers for data storage: a polymer in which two of the disperse red 1 functional group, which is illustrated in Chemical formula 1, are bonded to a branched chain per each repeat unit, and four other polymers which are illustrated in Chemical Formulas, 2 to 5, respectively.

<Chemical Formula 1>

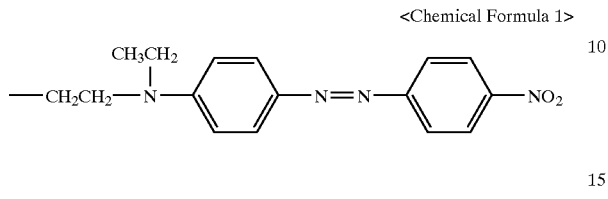

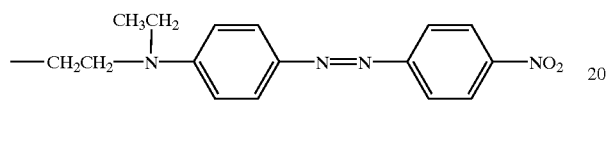

wherein n is a integer; m is 2, 4, 6, 8 or 10; R is the disperse red 1 functional group;

<Chemical Formula 2>

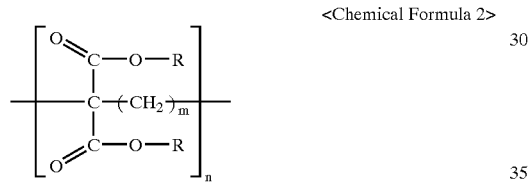

and the average molecular weight of the polymer is in the range of from about 2,000 to 15,000.

<Chemical Formula 3>

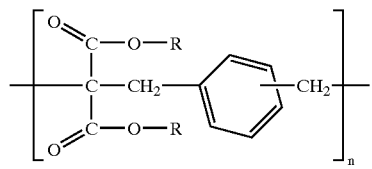

wherein n is an integer; two —CH$_2$— are bonded to a benzene ring in orto-, meta- or para-position in the above R is the disperse red 1 functional group

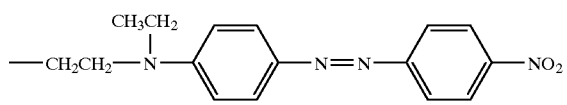

and the average molecular weight of the polymer is in the range of from about 2,000 to 15,000.

<Chemical Formula 4>

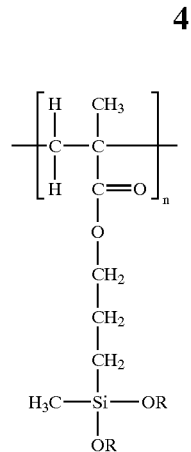

wherein n is an integer; R is

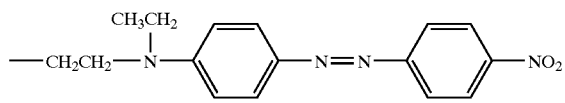

and the average molecular weight of the polymer is in the range of from about 2,000 to 15,000.

<Chemical Formula 5>

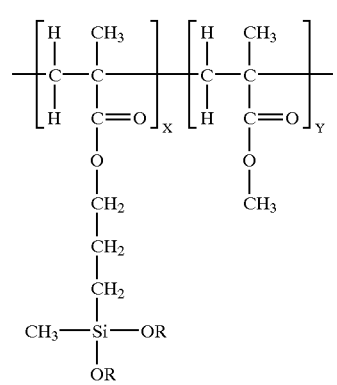

wherein R is

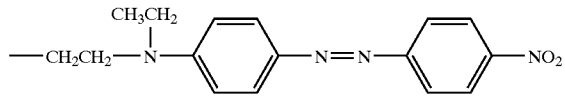

the ratio of X:Y is 3~97 mol %: 97~3 mol % and the average molecular weight of the polymer is in the rage of from about 2,000 to 15,000.

Preferably, the average molecular weight of the polymers which are illustrated in Chemical Formulas 2 to 5 is in the range of from about 3,000 to 10,000, respectively.

In addition, preferred ratio of X:Y in the polymer of Chemical Formula 5 is 5~30 mol %: 95~70 mol %.

The present invention provides a blend copolymer for data storage, which is prepared by mixing one of the polymers illustrated in Chemical Formulas 2 to 5 to either polymethylmetacrylate or polyvinylcarbazole in the tetrahydrofaran(THF) aqueous solution.

Here, the polymer selected from Chemical Formulas 2 to 5 can be added 5% to 30% by weight of the above blend copolymer.

Another aspect of the present invention provides a reversible optical data storage device, which comprises an Ar ion laser light source 2; a polarizing plate 15 on which blue laser irradiated from the light source 2 gets incident; an optical attenuator 13 on which the blue laser that passed through the polarizing plate gets incident; a wave plate 12 on which the polarized light that passed through the optical attenuator gets incident; and a data storage media 6, which is coated with the polymer for data storage in accordance with the present invention, and located in the path of the polarized light that passed through the wave plate.

Here, the above described data storage media is formed by comprising the steps of:

(a) dissolving the polymer aforementioned into an organic solvent and coating a substrate;

(b) heating the substrate at the polymer's specific melting point; and (c) cooling the substrate below the glass transition temperature ($T_g$) to fixate the polymer's isotropic state.

In the above device, the Ar ion laser light source emits 400 nm to 520 nm short waves.

For the data storage device described above, sound optical modulator can be additionally placed between the optical attenuator 13 and the wave plate 12 in order to screen the Ar ion polarized light transmission, so that data recording speed can be reached down to 1 microsecond.

Still another aspect of the present invention provides a reversible optical data storage device, which comprises an IR laser light source 2; optical lenses 3 and 4, on which the irradiated light gets incident; a first polarizing plate 5, on which the light from the lens gets incident, a data storage device 6, which is coated with the polymer for data storage in accordance with the present invention, and located in the path of the light that passed through the first polarizing plate 5; a second polarizing plate 7, which is located in the path of the light that passed through the media 6, and has a polaroid axis perpendicular to that of the first polarizing plate 5; and an output device, which outputs the data stored on the media 6 by inputting the light emitted from the second polarizing plate 7.

In a broad sense, "a data storage device" throughout the specification indicates a device with the capacity of data record and/or data read, and preferably, the data storage media described above is prepared by the method explained here.

The preferred IR laser light source is either 847 nm Ga/As or 633 nm He—Ne. The data storage media is positioned at an angle of $(1+n)\pi/4$ (n is 0, 2, 4 or 6) with the polarization axis of the first polarizing plate and that of the second polarizing plate, respectively.

The output device further comprises a digital voltmeter 10, and a computer 16 for processing the detected current intensity according to time, thus data record and data read data can be performed concurrently.

Another embodiment of the present invention provides a reversible optical digital data storage method, which comprises the steps of:

(a) coating a substrate with the polymer according to the present invention;

(b) heating the coated substrate at a temperature higher than the employed polymer's melting point in order to arrange the substrate in the isotropic state, and form a data storage media by cooling the same below the glass transition temperature ($T_g$) of the polymer employed;

(c) recording digital data in the data storage media by passing through the polarized light that was irradiated from Ar ion laser light source a first polarizing plate, an optical attenuator and a wave plate successively;

(d) reading the digital data by inputting the digital data to an output device after passing the polarized light irradiated from an IR laser light source through an optical lens, a second polarizing plate, the data storage media, and finally a third polarizing plate which has a polarization axis perpendicular to that of the second polarizing plate;

(e) erasing the recorded and read digital data from the data storage media;

(f) rewriting and re-reading new data by repeating the steps of (c), (d) and (e) in the data storage media.

Yet another embodiment of the present invention provides a reversible optical analogue data storage method, which comprises the steps of:

(a) coating a substrate with the polymer according to the present invention;

(b) heating the coated substrate at a higher temperature than the polymer's melting point in order to arrange the substrate in the isotropic state, and form a data storage media by cooling the same below the glass transition temperature ($T_g$) of the polymer employed;

(c) recording analogue data in the data storage media by passing through the polarized light that was irradiated from Ar ion laser light source a first polarizing plate, an optical attenuator and a wave plate successively;

(d) reading the analogue data by inputting the analogue data to an output device after passing the polarized light irradiated from an IR laser light source through an optical lens, a second polarizing plate, the data storage media, and finally a third polarizing plate which has a polarization axis perpendicular to that of the second polarizing plate;

(e) erasing the recorded and read analogue data from the data storage media;

(f) rewriting and re-reading new data by repeating the steps of (c), (d), and (e) in the data storage media.

The digital or analogue data storage media is positioned at an angle of $(1+n)\pi/4$ (n is 0, 2, 4 or 6) with the polarization axis of the second polarizing plate and that of the third polarizing plate, respectively.

During the process of reading the analogue data on the thin film, it is preferred to use a low output polarizing microscope where the second polarizing plate and the third polarizing plate are perpendicularly attached.

Preferably, the erasing the digital or analogue data process of step (f) is carried out by erasing the data in the data storage media by passing the circular polarized light through the media, which was emitted from the wave plate having $\lambda/4$ wave length when the wave plate in the step (c) has $\lambda/2$ wave length. Also, the digital data can be erased in the data storage media by heating the media at a higher temperature than the melting point of the polymer employed.

In the meantime, the polymer for data storage, which is illustrated in Chemical Formula 2 can be prepared by polymerizing malonic acid ester monomer illustrated in Chemical Formula 6 and $C_mH_{2m}Br_2$ (m is 2, 4, 6, 8 or 10) in which brome is substituted with the first carbon and the mth carbon.

<Chemical Formula 6>

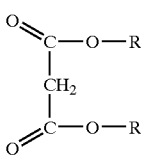

wherein R is

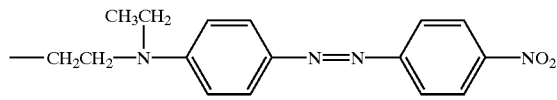

The polymer for data storage, which is illustrated in Chemical Formula 3can be prepared by polymerizing malonic acid ester monomer illustrated in Chemical Formula 6 and xylen having two substituted brome.

<Chemical Formula 7>

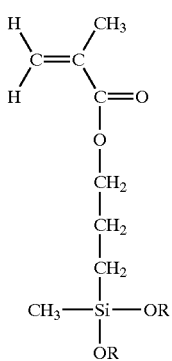

wherein R is

<Chemical Formula 6>

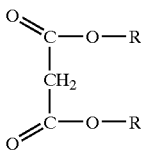

The polymer for data storage, which is illustrated in Chemical Formula 4 can be prepared by polymerizing silicate ester monomers illustrated in Chemical Formula 7.

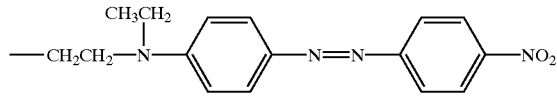

wherein R is

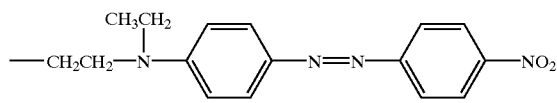

The polymer for data storage, which is illustrated in Chemical Formula 5 can be prepared by polymerizing silicate ester monomer and methylmetacrylate (MMA).

The preferred glass transition temperature ($T_g$) of polymers is in a range of from about 20 to 100° C.

The maximum absorption wavelengths of the monomers and polymers employed in the present invention are in a range of from about 450 nm to 500 nm. Thus, the polymer in the invention can absorb the blue light, which was oscillated from Ar ion laser and cause an optical change, e.g., birefringence, at a maximum speed.

The present inventors have found that when the polymer of the Chemical Formula, having two of —$CH_2$— in para position in the benzene rig in particular, and the polymer of the Chemical Formula 5 are respectively employed in a data storage media, the data storage media demonstrated excellent data storage stability even at 80° C. outside.

The R group, that is, organic dyes, in the polymers of the present invention is 60% to 80% by weight of repeat units in the polymer, which is relatively higher than 15% to 40%, typically observed values in prior arts (U.S. Pat. Nos. 4,551,819, 5,024,784, and 5,173,381; German Patent No. 3623395; Japanese Patent Publication No. 63-87626). In other words, the polymers in the present invention contain more functional groups with optical properties in high density.

To be short, the polymers according to the present invention are prepared to be able to record the data in microsecond and enhances the data stability. Also, the data storage device employing the polymers aforementioned demonstrates much improved data recording speed and data storage stability as compared to that of prior arts.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
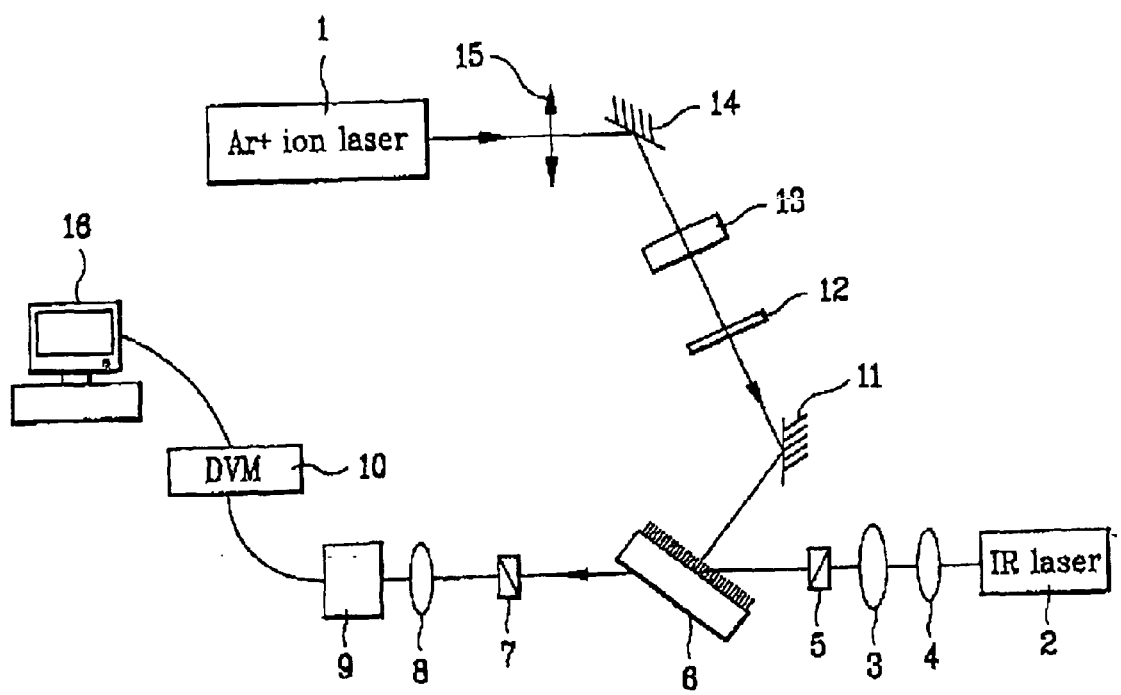
FIG. 1 is a reversible optical data storage device according to an embodiment of the present invention.

A preferred embodiment of the present invention will now be described with reference to the accompanying drawings. In the following description, same drawing reference numerals are used for the same elements even in different drawings. The matters defined in the description such as a detailed data storage media coated with a polymer according to the invention and a reversible optical data storage method using the same are nothing but the ones provided to assist in a comprehensive understanding of the invention. Thus, it is apparent that the present invention can be carried out without those defined matters. Also, well-known functions or connections are not described in detail since they would obscure the invention in unnecessary detail.

Storage Method for Digitized Data

A glass plate coated wit a polymer in which two of disperse red 1 functional group containing azobenzene are bonded to a branched chain was heated at a temperature higher than the melting point ($T_m$) of the polymer employed. Then, the glass was rapidly cooled below the glass transition temperature ($T_g$) in order to make the molecules in the state of disorder, namely, isotropic state in order to prepare a data storage media Then, by irradiating blue polarized light from Ar ion laser to the extent of desired intensity, which is illustrated in an equipment drawing FIG. 1, onto the above data storage media, digital data was recorded and after the process of cooling the polymer employed to the data storage media below the glass transition temperature ($T_g$), the data was stored.

In order to properly record the digital data, the intensity of blue light to be irradiated and the time required are subject to the width of a thin film and molecular structure of the polymer that coats the data storage media.

In principle, when a data storage media is exposed to polarized light. azobenzene in the polymer goes through photoisomerization reaction as shown below, so that the irradiated part of the polymer gets orientated equally at the isotropic state.

The above data storage method of the present invention is quite contrary to the conventional thermal recording method which goes though phase transition from liquid crystal phase to isotropic phase by ultraviolet or laser (polym. commun., 24,346 (1983)), and hologram method (German Patent No. 3,623,395).

Although a related technology had been registered as Korean Patent No. 77801, and publicized in the Official Gazette No. 1999-17317, the present inventors developed a unique data storage method for the first time. In other words, the polymer in the Korean Patent or the Official Gazette involves ultraviolet sensitive organic dyes, but the polymer employed to the present invention causes optical reaction due to blue laser developed by the present inventors.

Thus, in order to develop a new data storage method, an optical device and a new material that is sensitive to a light source should be developed concurrently or beforehand.

Reading Digital Data

The present invention made it possible to read the data in the digital data storage device as shown in the optical equipment drawing (FIG. 1).

The mechanism of data read is explained below.

First, a thin film containing data (data storage media) is inserted between the two crossed polarizing plates. Here, the data exposed to the blue polarized light goes through birefringence, allowing the transmittance of reading light to be maximized. However, the transmittance of the unexposed data becomes "o" in the absence of birefringence.

During the process of data record, when the polarizing axis of the incident record light is at an angle of 45° against the crossed polarizing direction of two IR polarizing plates in a data read device, IR transmittance for the data exposed to the polarizing light is the greatest, while IR light is screened to the data unexposed to the polarizing light.

The transmittance difference of IR laser is then checked by a photodetector. The photodetector converts the intensity

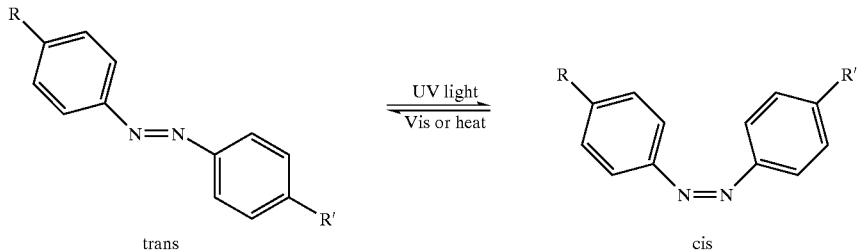

That is to say, when data is recorded, due to the irradiated blue polarized light, the structure of azobenzene changes from a stable trans-form to a cis-form, called photoisomerization. At this point, the free and disoriented disperse red 1 molecules are arrayed perpendicular to the blue polarized light. (Nateure 1991, 351, 49; Makromol. Chem. Rapid Commun., 8, 477 (1987); Applied, optics, 23, 4309 (1984)).

In detail, when disperse red 1 molecules on the thin film for recordation are exposed to blue polarized light, they change from isotropic disorientated state to arranged in perpendicular to the polarized light, and causes birefringence. Meanwhile, the unexposed molecules do not cause the birefringence.

Here, as to the birefringence induced part, the data signal takes the value "1", and the other part without birefringence takes "0" for the data signal value. From the difference of these values, digital data is stored.

The digital data signal has direct impact on the transmittance of reading light during the process of data reading.

of incident light thereon to voltage difference, which is numeralized on a digital voltmeter, and finally read through a computer.

As for a read light, it is preferable to use 847 nm Ga/As laser or 635 nm He—Ne laser.

Further, based on the principle of data read by the IR transmittance difference between the data exposed to the blue polarized laser and the data which is not, by adjusting the angle of polarized light, it is also possible to store different kinds of datum into the same record layer over and over.

As explained before, when blue polarized laser is irradiated to a thin film of the polymer employed as a data storage media, the disperse red 1 molecules which are exposed to the polarized light are arrayed to perpendicular to the incident polarized light.

By measuring the intensity of IR by placing a thin film inducing birefringence ($\Delta n$) in between the crossed polarizing plates, the following equation is obtained:

$$\frac{I}{I_0} = \sin^2\left(\frac{\pi \Delta n d}{\lambda}\right) \sin^2(2\theta)$$

wherein, $\Delta n$ is birefringence of a data storage media; $\lambda$ is IR light wavelength during the process of data read; $I_0$ is the intensity of light before transmitting a sample; I is the intensity of light after transmitting the sample; d is the thickness of the sample; and $\theta$ is the angle between the polarizing axis and optic axis of the polymer chain orientated from Ar ion polarized laser.

Accordingly, if $\theta$ is one of 45°, 135°, 225°, or 315°, the intensity of each IR transmission light of the part irradiated by laser and the part which is not takes a value either "0" or $\sin^2(\pi d \Delta n/\lambda)$.

In this way, the data that is on-state (e.g., $\sin^2(\pi d \Delta n/\lambda)$), or off-state (e.g., 0) can be recorded and detected in space.

In addition, by optionally adjusting the angle of the incident blue polarized laser to a data storage media, different kinds of datum can be stored into the same record layer over and over.

For example, when the angle of the incident polarizing light is changed to 1°, $\theta$ becomes $(\theta+1)°$ according to the equation above, which indicates when the angle between two crossed polarizing plates during the process of data read and the changing polarizing axis, $\theta$, is 45°, 135°, 225°, or 315°, the ratio of signal and noise (S/N ratio) is maximized.

Analogue Data Storage Method

The same method as digital data storage method is employed except that a photomask, in which a fine pattern having 2 $\mu$m to 50 $\mu$m line width is recorded, is placed on the data storage media.

However, in order to obtain a picture (FIG. 5) with enhanced resolution for the analogue data in the photomask, it is preferred to use the blue light having the intensity higher than 5 mW/cm², and the irradiation time for longer than 5 minutes. These conditions are required when using a polarizing microscope because it is necessary to have much higher transmission of analogue data than the intensity of the visible light that is reflected from the outside in order to read analogue data.

Analogue Data Read

As described above, the analogue data can be read by using a lowput optical polarizing microscope which is equipped with the crossed polarizing plates.

Typically, when the optic axis of incident blue laser is at an angle of 45° to the crossed polarization direction of the optical polarizing microscope. data with the excellent resolution of the largest contrast can be obtained.

Erase Stored Data and Rewrite

The process of erasing the stored data can be performed by two ways: first, as shown in FIG. 1, rotating the blue polarized laser that passed through the optical attenuator 13 by using $\lambda/4$ wave plate 12, instead of $\lambda/2$ wave plate used for data read, for obtaining the original polarized light, and erasing the data by irradiating the original polarized light to a data storage media 6; second, heating the data storage media 6 at a higher temperature than the melting point of the polymer employed so that the disperse red 1 molecules arranged in perpendicular due to the blue polarized laser during the process of data record are rearranged.

The new data can be rewritten by cooling the data—free data storage media to a room temperature, and repeating the data record procedure described above.

In result, the data storage media coated with the polymer for data storage according to the present invention demonstrated excellent resolution and data stability.

The present invention will now be described in more detail by referring to the examples below, which are not intended to be limiting.

1. Synthesis of Polymer for Data Storage

INVENTION EXAMPLE 1

Synthesis of Polymer of Chemical Formula 2

1. Synthesis of Malonic Ester Monomer

Using 3000 L round flask, to 70 ml of THF solvent was added 2.0 g ($6.42\times10^{-3}$ mol) of disperse red 1 and the mixture was cooled at 0° C. to 5° C. Into the mixture, 5 ml of aqueous THF solution containing 0.22 ml ($3.21\times10^{-3}$ mol) of malonyl dichloride was slowly dropped, and was stirred for 48 hours. The solvent THF was removed using a rotary distillator, and the resultant was melted in 35 ml of chloroform, washed by distilled water(200 ml×4 times), and then chloroform was removed using a rotary distillator. The resultant was again melted in a small amount of chloroform and using a mixed solution of chloroform and ethylacetate at a ratio of 5:1 as a developer, columnchromatography was performed to yield malonic acid ester monomer (yield: 35%, m.p.: 130° C.). When UV/VIS spectrum was examined on the resulting monomer, the absorption was the highest at a wavelength ($\lambda_{max}$) of 466 nm.

2. Synthesis of Polymer A

Using 2000 L round flasks to 17 ml of THF solution was added 0.1 g ($1.435\times10^{-3}$ mol) of the prepared malonic acid ester monomer above and 0.17 g ($2087\times10^{-3}$ mol) of NaH. The mixture was stirred for 10 minutes. Into the mixture, 3 ml of THF aqueous solution containing 0.22 ml ($1.435\times10^{-3}$ mol) of 1,6-dibromohexane was slowly dropped, and the resultant was polymerized at 65° C. for 48 hours. The resulting polymer was precipitated in 500 ml of methanol, filtered off, and dried to yield the title polymer of Formula 2: "polymer A". In result, polymerization conversion rate of the resulting red polymer was 60%, and average molecular weight was about 5000, which could be changed by adjusting polymerization time. $T_g$ of the resultant was about 30° C., and $T_m$ was not measured. Among other title polymers of Formula 2, the $\lambda_{max}$ was observed at 464 nm when m was 6

In order to prepare polymers, for which m is 2, 4, 8, or 10, the same procedure above was repeated except that 1,2-dibromoethane, 1,4-dibromobutane, 1,8-dibromooctane, or 1,10-dibromodecane was used instead of 1,6-dibromohexane.

<Chemical Formula 2>

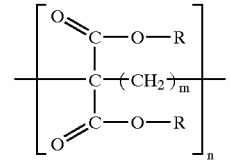

INVENTION EXAMPLE 2

Synthesis of Polymer B

The procedure for preparing polymer A in the Example 1 was repeated except that 0.38 g ($1.435\times10^{-3}$ mol) of $\alpha$, $\alpha'$-dibromo-p-xylene, $\alpha$, $\alpha'$-dibromo-o-xylene, or $\alpha$, $\alpha'$-dibromo-m-xylene is used instead of 1.6-dibromohexane to yield polymer A. In particular, malonic acid ester and $\alpha$, $\alpha'$-dibromo-p-xylene were polymerized to yield the title polymer of Formula 3: "polymer B" (molecular wt: ≈5500, $T_g$: ≈90° C., $\lambda_{max}$: 466 nm).

<Chemical Formula 3>

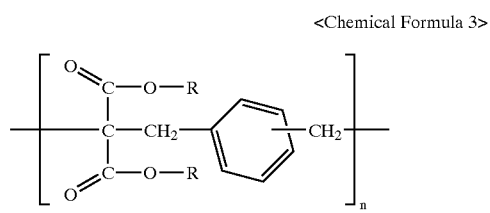

INVENTION EXAMPLE 3
Synthesis of Polysilicate
1. Synthesis of Silicate Ester Monomer Using 3000 L of round flask, to 50 ml of methylchloride was added 1.13 g ($4.14 \times 10^{-3}$ mol) of disperse red 1, and under a N atmosphere, 10 ml of methylenechloride containing 0.5 g ($2.07 \times 10^{-3}$ mol) of 3-methacryloxypropyl methyldichlorosilane) was slowly dropped. The mixture was stirred for 48 hours and washed by distilled water(200 ml×4 times). Using a rotary distillator, methylenedichloride was removed. The resultant was then melted in a small amount of chloroform and using a mixed solution of chloroform and ethylacetate at a ratio of 7:1 as a developer, columnchromatography was performed to yield silicateester monomer monomer (yield: 40%, m.p.: 88.5° C., $\lambda_{max}$: 482 nm).

2. Synthesis of Polysilicate Polymer

Using an ample, to 4 ml of THF was added 0.4 g ($5.01 \times 10^{-4}$ mol) of silicate ester monomer, and 0.012 g ($7.3 \times 10^{-5}$ mol) radical initiator AIBN. By freeze-thawing method, the oxygen inside of the mixture was removed, and sealed the ample. The resulting solution was subject to radical polymerization for 48 hours at 65° C. using an oven. The mixture was precipitated in 500 ml of ethanol, filtered and dried to yield the tile polymer 4, polysilicate homo polymer (polymerization conversion percentage; 50%, average molecule wt: 6500, $T_g$: 48° C., $\lambda_{max}$: 474 nm). Here, depending on the concentration of AIBN, the molecule weight was adjusted from 5,000 to 10,000.

<Chemical Formula 4>

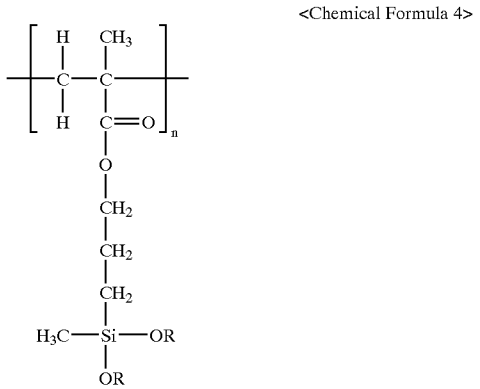

INVENTION EXAMPLE 4
Synthesis of Polysilicate Ester-PMMA Copolymer

Using an ample, to 5.6 ml of THF was added 0.4 g ($5.01 \times 10^{-4}$ mol) of silicate ester monomer; 0.017 g ($1.0 \times 10^{-4}$ mol) of AIBN, and 0.15 g ($1.5 \times 10^{-3}$ mol) of conventional MMA monomer. By freeze-thawing method, the oxygen inside of the mixture was removed, and sealed the ample. The resulting solution was subject to radical copolymerization for 48 hours at 65° C. using an oven. The mixture was precipitated in 500 ml of ethanol, filtered and dried to yield the tile polymer 5, red silicate ester-PMMA copolymer. Here, the ratio of silicate ester monomer and MMA monomer was 25 mol %: 75 mol %. Further, another experiment was undertaken by modifying the ratio of silicate ester monomer and MMA monomer, such as, 7 mol %: 25 mol %, 50 mol %: 50 mol %, and 95mol %: 5 mol %. In this way, polymers with different [X:Y] were prepared and the results are illustrated in Table 1 below.

TABLE 1

Result of co-polymerization of polysilicate ester-PMMA

| Copolymer | Polymerization conversion rate | Molecule Weight | Co-Polymerization condition (II): MMA (mol %) | Mol ratio[a] of X:Y of Copolymer (VI) | $T_G$[b] (° C.) |
|---|---|---|---|---|---|
| Structural Formula 5-1 | 45 | 11,600 | 75:25 | 57:43 | 68.0 |
| Structural Formula 5-2 | 65 | 13,600 | 50:50 | 42:58 | 68.1 |
| Structural Formula 5-3 | 74 | 18,700 | 25:75 | 19:81 | 76.1 |
| Structural Formula 5-4 | 53 | 25,800 | 5:95 | 3:97 | 93.0 |

[a]The mole ratio of silicate ester monomer and MMA monomer was calculated using H-NMR spectrum analysis method.
[b]$T_g$ was measured using DSC thermal analysis method.

II. Result of data record and data read employing a data storage device of the invention

INVENTION EXAMPLE 5
Manufacture of a Digital Data Storage Media and Data Read Result 1. Manufacture of a Digital Data Storage Media.

Poly(malonic acid ester) homopolymer, prepared in the Example 2, was dissolved in THF solvent to the extent of 4% concentration. The mixture was dropped on the glass (2 cm×2 cm), and spin coated in order to manufacture a thin film with a thickness of 0.2 $\mu$m. Later, the solvent was removed under the reduced pressure. The film was heated on a hot plate at 100° C. for 2 minutes, and cooled down to below $T_g$ of the polymer employed to obtain a isotropically fixed data storage media. Ar ion laser in FIG. 1 (model: INNOVA 400, wavelength: 488 nm) was irradiated to the data storage media to record digital data. Finally, the data storage media was cooled down to below $T_g$ of the polymer employed for storing data. Here, the present inventors found that data record speed and data storage stability were greatly affected by the intensity of record light, the thickness of a thin film of a polymer employed to a data storage media, and the molecular structure of the polymer.

2. Data Read from a Digital Data Storage Media

Figure 2:
FIG. 2 is a digital data picture obtained reading the data through an optical polarizing microscope, in which the digital data is recorded in a data storage media coated with a polymer of the invention and irradiated by a linear polarized light argon-ion laser for ten microsecond.

FIG. 2 shows a picture (enlarged by 50 times), taken by a optical polarizing microscope, of digital data on a poly malonic acid ester polymer coated data storage media, to which 1 mW/cm² to 5 mW/cm² linear polarized Ar ion laser was irradiated for 10 microsecond. The bright side on the picture shows the digital data recorded by birefringence as it gets perpendicular to a polarized record light.

Figure 3:
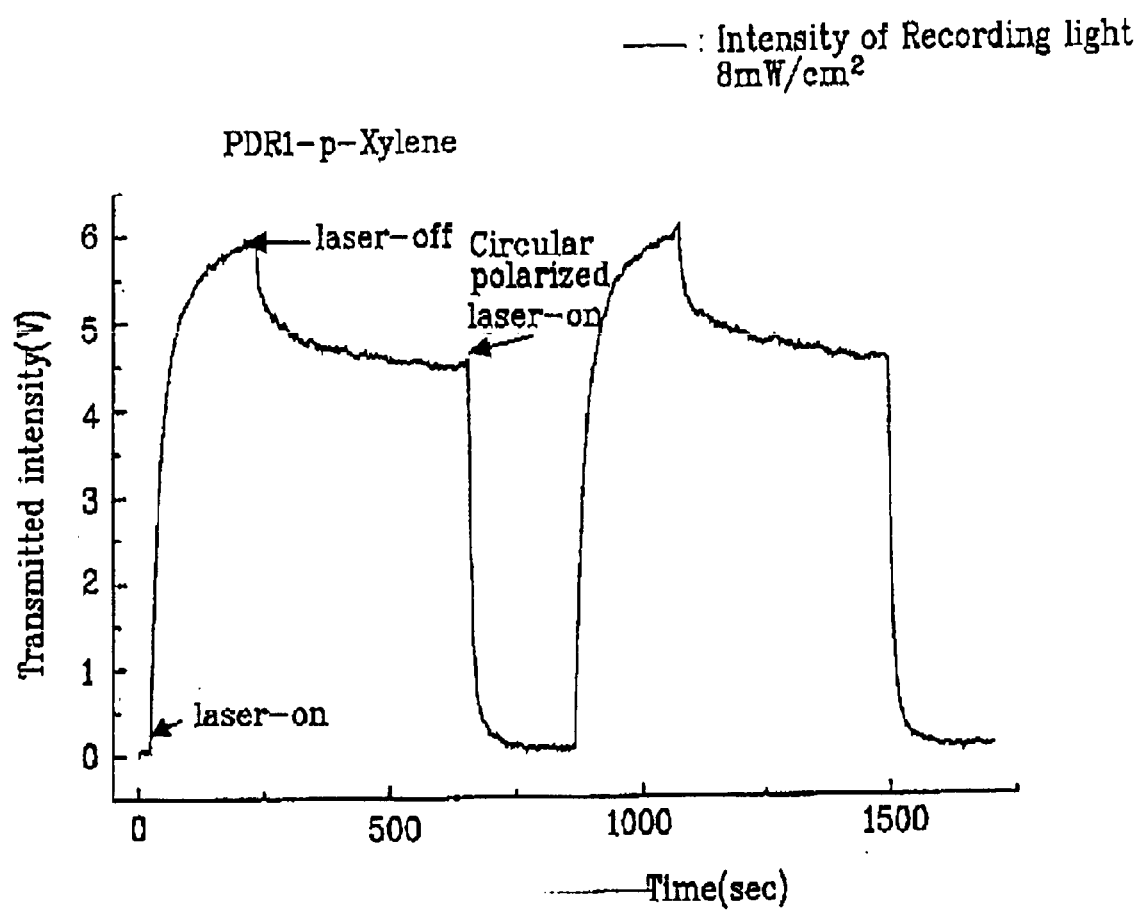
FIG. 3 is a graph illustrating measurements of transmission of RW (read/write) light SDL 800 against data, in which the data is recorded using an 8 mW/cm$^2$ Ar ion laser on a polymer prepared by polymerization of p-xylene and malonic acid ester.

FIG. 3 shows the result of an experiment for researching a reversible data storage method (record-read-erase-rewrite). In the experiment, data was recorded in a data storage media which was prepared by the poly (malonic acid ester) polymer, using Ar ion laser (intensity: 8 mW/cm²) and concurrently, transmitted intensity of the read light (SDL 800) was measured. Here, the function graph explains the relationship between transmitted intensity and irradiation time of read light in real-time. The underlying concept of the graph is that when the read light is turned on, the polymers on a data storage media are arrayed to record data (manifested as increase in the transmitted intensity), and then, Ar ion laser circular polarized light is irradiated (refer to "Erase the stored data and rewrite data") so that the stored data is erased thereby. Once the previously stored data is erased, new data can be rewritten repeatedly following the same procedure of 'Data read' aforementioned. Thus, this reversibility of data is repeated very steadily and equally.

Another way to erase the data is heating the data storage media at a higher temperature than the melting point of the polymer employed to the media.

Figure 4:
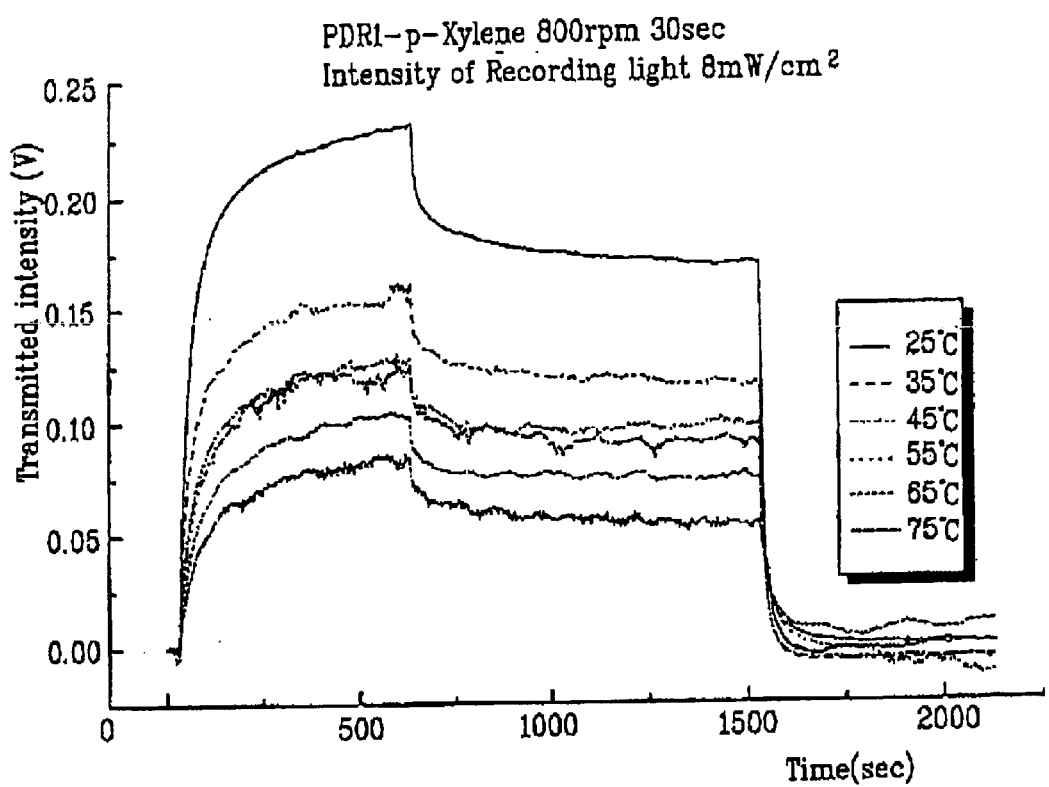
FIG. 4 is a graph illustrating data stability corresponding different temperatures, in which the data is obtained from a data storage media coated by the polymer described in FIG. 3.

FIG. 4 shows the relationship of the stability of data in a data storage media which is coated with the polymer having two of —$CH_2$— in para position and different temperatures. In order to find out the data storage stability against temperature, a data storage media was placed in a hot plate made of two aluminum plates maintaining a constant temperature and read light was irradiated to measure transmitted intensity of the read light. In result, the data stability was the greatest at a 75° C. Thus, the present inventors successfully developed a data storage media with such improved stability that has not been obtained through any other prior arts.

INVENTION EXAMPLE 6
Method for Analogue Data Record and Read on a Tin Film Coated with Polysilicate Polymer A data storage media coated with polysilicate homopolymer prepared from the Example 3, and a photomask (linewidth: 2~50 μm) was placed on the media. Then, Ar ion laser polarized light was irradiated to the photomask on which analogue data was drawn to read the data.

Figure 5:
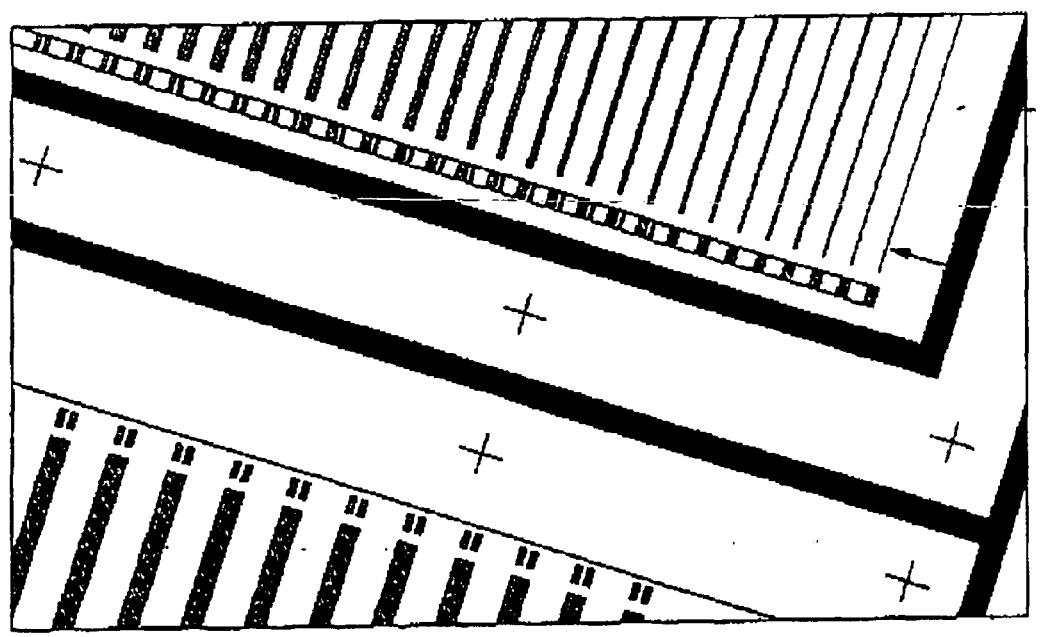
FIG. 5 is a schematic view of an analogue data picture obtained reading the analog data through an optical polarization microscope, in which the data is recorded in a data storage media irradiated by a 10 nW/cm$^2$ Ar ion laser polarization for five minutes and cooled down until below the glass transition temperature; and, FIG. 6 is a graph, illustrating data read of a data storage media, which is coated with a polymer prepared by polymerization of the compound having the chemical structure 2 and polyvinylcarbazol.

FIG. 5 is a picture, taken by an optical polarizing microscope, of analogue data on a data storage media, to which 10 mW/cm$^2$ Ar ion laser polarized light was irradiated for 5 minutes, and cooled down below $T_g$ of the data storage media. Here, the linear width indicated as "→" is 2 μm. As seen in the figure, resolution of data was excellent.

INVENTION EXAMPLE 7
Synthesis of Blend Polymer, Data Record and Data Read of a Thin Film Coated with the Same The polymer A from the Example 1 and the conventional polymer PVK were dissolved in THF to make 4% polymer solution. The resulting solution coated glass and thereby a data storage media containing a thin film at a thickness of about 0.3 μm for data storage. The ratio of the polymer A and PVK was 1 wt %:9 wt %. On the thin film above, the same experiment of data record and read as that of the Example 5 was repeated.

Figure 6:
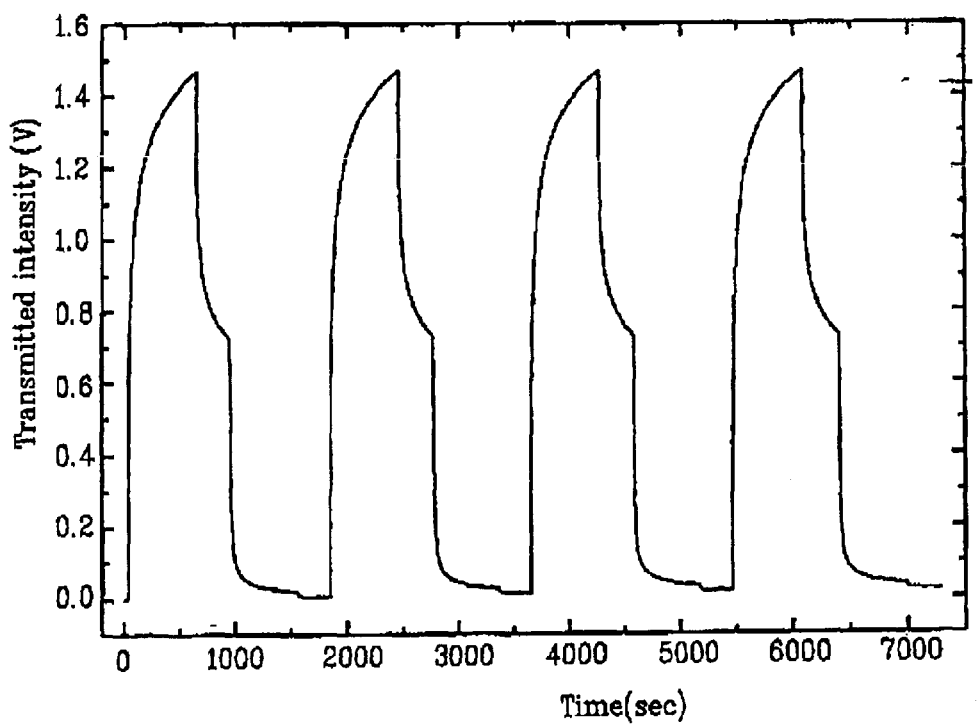

FIG. 6 is a graph which shows the result of reading the data from the data storage media coated with the above blend polymer of Polymer A and PVK. From the result, it was proved that the blend polymer can be applied to a reversible and optical data storage media as well.

Preferred Ar ion laser is Model No. INNOVA 400 having a wavelength 458 nm, 476 nm, 488 nm, 496 nm or 515 nm of COHERENT.

As for the IR laser, it is preferred to use Ga/As laser (Model No. SDL-5412-H1) having a wavelength of 847 nm of SPECTRA DIODE LAPS and 100 mW(100 mA), or SDL 800 IR laser.

As for the polarizer; it is preferred to use a broad band palorization beam splitter cube (Model No. 05FC16PB5) having extinction ratio of 1000:1 and being applicable to a wavelength in a range of from 620 nm to 100 nm of NEWPORT.

In addition, a multimeter produced by HEWLETT PACKARD company (Model No. 34401A) is preferably used.

Therefore, a data storage media coated with a polymer according to the present invention, and an optical device (refer to FIG. 1) have advantageous for the following reasons:

Firstly, in prior arts, thermal record storage method and hologram data storage method requires equal pre-orientation of liquid crystal during the process of data record, for which a specific electro-optical cell device is further needed. However, in the present invention, since it does not require such equipment, it can prevent energy loss due to high voltage used for pre-orientation. In addition, because there is no such thing like decomposition of organic dyes, e.g., azobenzene, in the present invention, it can secure data stability more effectively.

Secondly, the present invention has a very high signal/noise (S/N) ratio, that is, it has excellent data resolution from the viewpoint that contrast ratio between the data part which is exposed to blue polarized light and the part which is not is considerably high.

Lastly, the present invention does not show a falloff in contrast ratio, which is typically observed in the conventional thermal recording method due to diffused heat during the process of data record (Macromolecules, 24, 42 (1990)), so that it can maintain good resolution.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A polymer for data storage, in which two disperse red functional groups of Chemical Formula 1 are bonded to each repeat unit of the polymer <Chemical Formula 1>

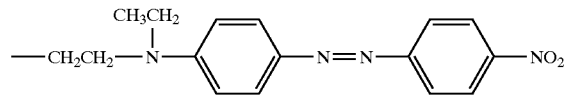

wherein the polymer has a structure of Chemical Formula 3 as follows:

<Chemical Formula 3>

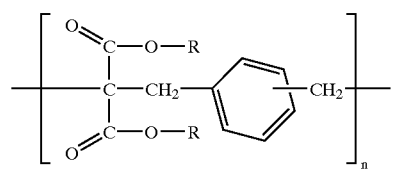

wherein n is an integer; two —CH$_2$— are bonded to a benzene ring in ortho-, meta- or para-position in the above, and R is the disperse red 1 functional group

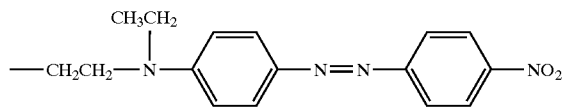

and the average molecular weight of the polymer is in the range of from about 2,000 to 15,000.

2. A polymer for data storage, in which two disperse red functional groups of Chemical Formula 1 are bonded to each repeat unit of the polymer <Chemical Formula 1>

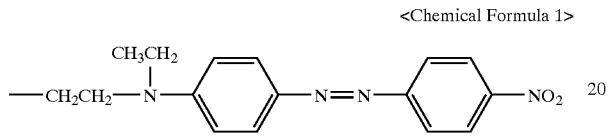

wherein the polymer has a structure of Chemical Formula 4 as follows:

<Chemical Formula 4>

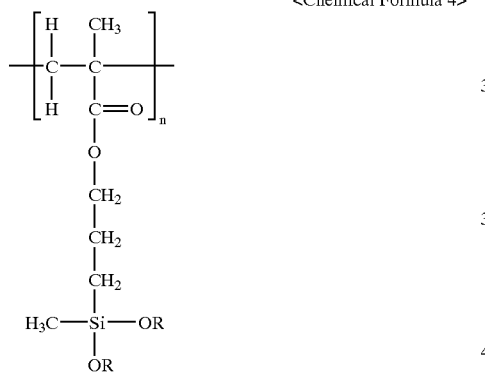

wherein n is an integer; R is

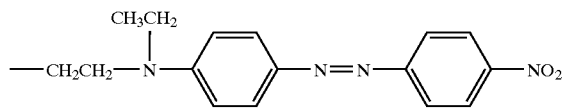

and the average molecular weight of the polymer is in the range of from about 2,000 to 15,000.

3. A polymer for data storage, in which two disperse red functional groups of Chemical Formula 1 are bonded to the same repeat units of the polymer <Chemical Formula 1>

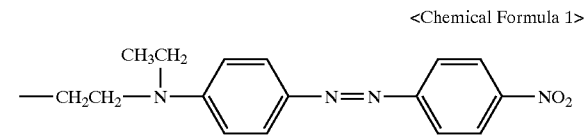

wherein the polymer has a structure of Chemical Formula 5 as follows:

<Chemical Formula 5>

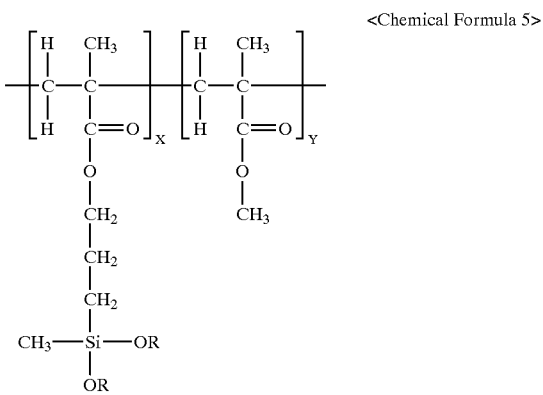

wherein R is

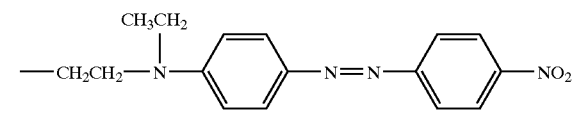

the ratio of X:Y is 3~97 mol %:97~3 mol %; and the average molecular weight of the polymer is in the range of from about 2,000 to 15,000.

4. A blend copolymer, which consists of 5~30% of the polymer of claim 2 by weight and 70~95% of polymethylmethacrylate or polyvinylcarbazole by weight.

5. A blend copolymer, which consists of 5~30% of the polymer of claim 1 by weight and 70~95% of polymethylmethacrylate or polyvinylcarbazole by weight.

6. A blend copolymer, which consists of 5~30% of the polymer of claim 3 by weight and 70~95% of polymethylmethacrylate or polyvinylcarbazole by weight.

* * * * *